United States Patent
Liu et al.

(10) Patent No.: US 9,053,660 B2
(45) Date of Patent: *Jun. 9, 2015

(54) COMBINED-SCREEN-BASED MULTI-PITCHING ANGLE SUSPENDED PANORAMIC SPACE 3D DISPLAY DEVICE

(75) Inventors: Xu Liu, Hangzhou (CN); Xinxing Xia, Hangzhou (CN); Haifeng Li, Hangzhou (CN); Zhenrong Zheng, Hangzhou (CN)

(73) Assignee: ZHEJIANG UNIVERSITY, Hangzhou, Zhejiang Province (CN)

( * ) Notice: Subject to any disclaimer, the term of this patent is extended or adjusted under 35 U.S.C. 154(b) by 191 days.

This patent is subject to a terminal disclaimer.

(21) Appl. No.: 13/808,569

(22) PCT Filed: Sep. 5, 2011

(86) PCT No.: PCT/CN2011/079311
§ 371 (c)(1),
(2), (4) Date: Jan. 4, 2013

(87) PCT Pub. No.: WO2013/026215
PCT Pub. Date: Feb. 28, 2013

(65) Prior Publication Data
US 2013/0176193 A1 Jul. 11, 2013

(30) Foreign Application Priority Data
Aug. 24, 2011 (CN) .......................... 2011 1 0246498

(51) Int. Cl.
| | |
|---|---|
| G03B 21/00 | (2006.01) |
| G09G 5/14 | (2006.01) |
| G03B 35/24 | (2006.01) |
| H04N 13/04 | (2006.01) |
| G02B 27/22 | (2006.01) |

(52) U.S. Cl.
CPC .............. *G09G 5/14* (2013.01); *H04N 13/0422* (2013.01); *G02B 27/225* (2013.01);
(Continued)

(58) Field of Classification Search
CPC ........... H04N 13/0422; H04N 13/0459; G02B 27/225; G02B 27/2214
USPC ............ 353/7, 30, 69–70, 79–80, 94; 359/22, 359/23, 485.02, 487.02, 487.04, 487.06, 359/530, 472, 458, 900; 348/42, 36, 51, 348/743–747; 349/5, 7–9; 345/30, 31
See application file for complete search history.

(56) References Cited

U.S. PATENT DOCUMENTS

| | | | | |
|---|---|---|---|---|
| 6,183,089 | B1 * | 2/2001 | Tehrani ............................. | 353/7 |
| 6,224,214 | B1 * | 5/2001 | Martin et al. ..................... | 353/7 |

(Continued)

FOREIGN PATENT DOCUMENTS

| | | |
|---|---|---|
| CN | 101511036 A | 8/2009 |
| CN | 101750868 A | 6/2010 |

(Continued)

OTHER PUBLICATIONS

Jing Xie, Omnidirectional View 3D Display Technology based on high speed projection, China Excellent Master Degree Thesis Database, May 25, 2011, 68 pgs.

*Primary Examiner* — Sultan Chowdhury
(74) *Attorney, Agent, or Firm* — Jacobson Holman PLLC; Jiwen Chen (57) ABSTRACT

This invention discloses a combined-screen-based multi-pitching angle suspended panoramic space 3D display device comprising: a combined deflective diffusing screen, a high speed projector, an image control module, a rotation detecting module, a motor and a drive mechanism. The high speed projector projects the composite images of the 3D objects of different pitching angles and horizontal 360° FOV to different areas of the combined deflective diffusing screen. Each area of the combined deflective diffusing screen controls the deflecting angle and the scattering angle in the vertical direction and the diffusing angle in the horizontal direction, ensuring that the eyes of the surrounding viewers of different height levels can see the 3D images corresponding to their respective positions, representing the 3D scene suspended over the combined deflective diffusing screen.

6 Claims, 4 Drawing Sheets

(52) U.S. Cl.
CPC ....... *G02B 27/2214* (2013.01); *G02B 27/2285* (2013.01); *G03B 35/24* (2013.01); *H04N 13/0459* (2013.01); *H04N 13/0493* (2013.01)

(56) References Cited

U.S. PATENT DOCUMENTS

| | | | |
|---|---|---|---|
| 7,277,226 B2 * | 10/2007 | Cossairt et al. | 359/446 |
| 7,364,300 B2 * | 4/2008 | Favalora et al. | 353/7 |
| 7,513,623 B2 * | 4/2009 | Thomas | 353/7 |
| 8,454,168 B2 * | 6/2013 | Cheng et al. | 353/7 |
| 2011/0254916 A1 * | 10/2011 | Fan et al. | 348/41 |

FOREIGN PATENT DOCUMENTS

| | | |
|---|---|---|
| CN | 102023470 A | 4/2011 |
| JP | 2006126238 A | 5/2006 |
| WO | WO9821619 A1 | 5/1998 |

* cited by examiner

COMBINED-SCREEN-BASED MULTI-PITCHING ANGLE SUSPENDED PANORAMIC SPACE 3D DISPLAY DEVICE

This is a U.S. national stage application of PCT Application No. PCT/CN2011/079311 under 35 U.S.C. 371, filed Sep. 5, 2011 in Chinese, claiming the priority benefit of Chinese Application No. 201110246498.6, filed Aug. 24, 2011, which is hereby incorporated by reference.

TECHNICAL FIELD

The present invention relates to three-dimensional (3D) display technical field, specifically, relates to a combined-screen-based multi-pitching angle suspended panoramic space 3D display device.

BACKGROUND TECHNOLOGY

Today, the traditional two-dimensional (2D) panel display and projection display have lagged behind people's demand on the display technology. New technology that can objectively represent the 3D objects as in the real world is required.

For the time being, matured 3D TV and movies available on the market mostly use 3D technology that realizes 3D visual effects with the viewing aids that achieve stereo visual effects through binocular parallax. This 3D display provides information of two views only, i.e., the 3D images watched from different positions are the same, which cannot provide different side views of the 3D scene as the watching position changes. Long time watching of this 3D display may result in negative reactions in viewers, such as headache and nausea.

Space 3D display is a technology that represents the image in a real 3D space that has real width, height and depth, which is an innovative display technology that is rapidly developing in recent years. Space 3D display is to excite the substance in the transparent display volume, and to form voxel through the generation, absorption or scattering of the visible radiation, or to accurately image side views to its corresponding position and direction. The 3D image formed in this way is just like a 3D object in the real space. Space 3D display not only can naturally satisfy almost all physiological and psychological depth cues, but also allow multiple persons to view from multiple angles simultaneously with naked eyes without any viewing aid, which is more comfortable and acceptable as to human's natural physiological sense in visual watching and depth perception.

As one type of the space 3D displays, stereoscopic 3D display has been developing rapidly in recent years, which was first commercialized in 2002 when the US-based company Actuality Systems developed the Perspecta™ 3D System, which uses a high speed DLP projector to project the 2D cross-section sequences onto a scattering screen that rotates at high speed, and blends the sequences into space 3D image utilizing the principle of visual persistence. However, the 3D scene presented by stereoscopic 3D display is transparent, space occlusion cannot be realized.

Panoramic space display is to display the image in each direction of the panoramic space to represent the corresponding positions and directions of the objects. In this way, the viewers around the 3D display space will see the image just like the natural 3D scene, which has space occlusion relationship. In recent years, many research institutes worldwide have carried out a great deal of research in respect of this display method, and some prototypes also have been made. However, most of these prototypes disclosed in the prior art provide a horizontal full field of view (FOV) of 360° only without presenting information of vertical pitching angles. That is to say, the full FOV 3D display in the prior art generally considers presenting the information of viewing in the horizontal direction without information of the vertical direction. This 3D display is to display a cycle of FOV image sequence corresponding to the surrounding viewpoints in the horizontal 360° direction. Through limiting the viewing angle of the image by oriented display media such as a diffusing screen, each image is visible within the small scope close to its viewpoint only; through high-density view splitting, the surrounding viewers will see different images that correspond to their viewpoints, realizing 3D effects.

Therefore, the space 3D display in the prior art generally requires motion of the display media to realize space scanning of 360° FOV in the horizontal direction, and the space position in the 3D scene displayed is the same as or close to the motion area of the media, interaction with the 3D scene such as touching is not possible, cannot satisfy people's need for more real 3D space display.

SUMMARY OF THE INVENTION

This invention provides a combined-screen-based multi-pitching angle suspended panoramic space 3D display device, which realizes multiple pitching angle suspended 3D display of 360° FOV. While allowing multiple persons to simultaneously view from multiple pitching angles in horizontal 360° FOV with naked eyes, this device also realizes space occlusion and allows exploration and interaction, overcoming the disadvantages of the prior art.

A combined-screen-based multi-pitching angle suspended panoramic space 3D display device comprises: a combined transmitted deflective diffusing screen, a high speed projector, an image control module, a rotation detecting module, a motor and drive mechanism. The combined transmitted deflective diffusing screen is connected with the drive mechanism, which, under the drive of the rotation of the motor, drives the combined transmitted deflective diffusing screen to rotate; the rotating axis of the combined transmitted deflective diffusing screen coincides with the lens' optical axis of the high speed projector; the high speed projector is arranged under the combined transmitted deflective diffusing screen, which projects the image upwards to the combined transmitted deflective diffusing screen; the high speed projector is also sequentially connected with the image control module and the rotation detecting module.

The combined transmitted deflective diffusing screen comprises multiple transmitted deflective sub-diffusing screens of different chief deflecting angles spliced together, with each transmitted deflective sub-diffusing screen corresponding to one pitching angle; wherein each transmitted deflective sub-diffusing screen comprises transmitted saw-toothed grating and cylindrical grating parallel in the grating direction; the transmitted saw-toothed grating comprises continuous arrangement of multiple triangular prism structures, and all the triangular prism structures in the transmitted saw-toothed grating in each transmitted deflective sub-diffusing screen have the same angle of inclination.

The rotation detecting module detects the rotating speed and initial position of the transmitted deflective sub-diffusing screen, and sends the signal of the rotating speed and the initial position to the image control module; the image control module controls the initial position and the projecting frame frequency of the high speed projector according to the signal received, realizing synchronism of the projected image sequence of the high speed projector and the rotation of the projective combined deflective diffusing screen.

Another type of combined-screen-based multi-pitching angle suspended panoramic space 3D display device comprises: a combined reflective deflective diffusing screen, a high speed projector, an image control module, a rotation detecting module, a motor and a drive mechanism. The combined reflective deflective diffusing screen is connected with the drive mechanism, which, under the drive of the motor, drives the combined reflective deflective diffusing screen to rotate; the rotating axis of the combined reflective deflecting scattering screen coincides with the lens' optical axis of the high speed projector; the high speed reflector is arranged over the combined reflective deflective diffusing screen, which projects the image downwards to the combined reflective deflective diffusing screen; the high speed projector is also sequentially connected with the image control module and the rotation detecting module.

The combined reflective deflective diffusing screen comprises multiple reflective deflective sub-diffusing screens of different chief deflecting angles spliced together, with each reflective deflective sub-diffusing screen corresponding to one pitching angle; wherein each reflective deflective sub-diffusing screen comprises a reflective saw-toothed grating and a cylindrical grating parallel in the grating direction; the reflective saw-toothed grating is arranged under the cylindrical grating, which comprises continuous arrangement of multiple triangular prism structures, with the surface of each triangular prism structure plated with reflective coating, and all the triangular prism structures in the reflective saw-toothed grating in each reflective deflective sub-diffusing screen have the same angle of inclination.

The rotation detecting module detects the rotating speed and initial position of the reflective deflective sub-diffusing screen, and sends the signal of the rotating speed and the initial position to the image control module; the image control module controls the initial position and the projecting frame frequency of the high speed projector according to the signal received, realizing synchronism of the projected image sequence of the high speed projector and the rotation of the reflective combined deflective diffusing screen.

In this invention, the image generator is an FPGA (Field Programmable Gate Array)-based control module, a DSP-based control module or a computer.

In this invention, the detecting module is a photosensor or a mechanical position switch.

This invention relates to a combined-screen-based multi-pitching angle suspended panoramic space 3D display device, which primarily uses the high speed projector and combined reflective deflective diffusing screen to display space 3D scene that has both 360° FOV in the horizontal direction and multiple pitching angles in the vertical direction, and separates the display media from the display space, allowing the displayed 3D scene to suspend in the air. When the surrounding viewers of different height levels watch the 3D scene, exploration and interaction are allowed.

Comparing to the suspended 3D display that has 360° full FOV in the horizontal direction only, this invention allows multiple pitching angles in the vertical direction to achieve full FOV space 3D display that can be watched from viewpoints at different height levels. The represented 3D objects are suspended in the air over the screen, of which the space position does not change as the viewers' height changes, and the viewers at different height levels all can see the 3D image that adapts to their height levels. In this way, the displayed 3D image allows multiple persons to view from around simultaneously with naked eyes, and allows exploration and interaction, more natural and comfortable as to people's real physiological perception to the real objects.

Where: combined transmitted deflective diffusing screen 1, high speed projector 2, image control module 3, rotation detecting module 4, motor 5, drive mechanism 6, combined reflective deflective diffusing screen 7, transmitted deflective sub-diffusing screen 11, transmitted saw-toothed grating 111, the first cylindrical grating 112, reflective deflective sub-diffusing screen 71, reflective saw-toothed grating 711, and the second cylindrical grating 712.

SPECIFIC EMBODIMENTS OF THE INVENTION

Below will explain the invention in detail in embodiments in combination with drawings. The invention is not limited to the following only.

Embodiment 1

Figure 1:
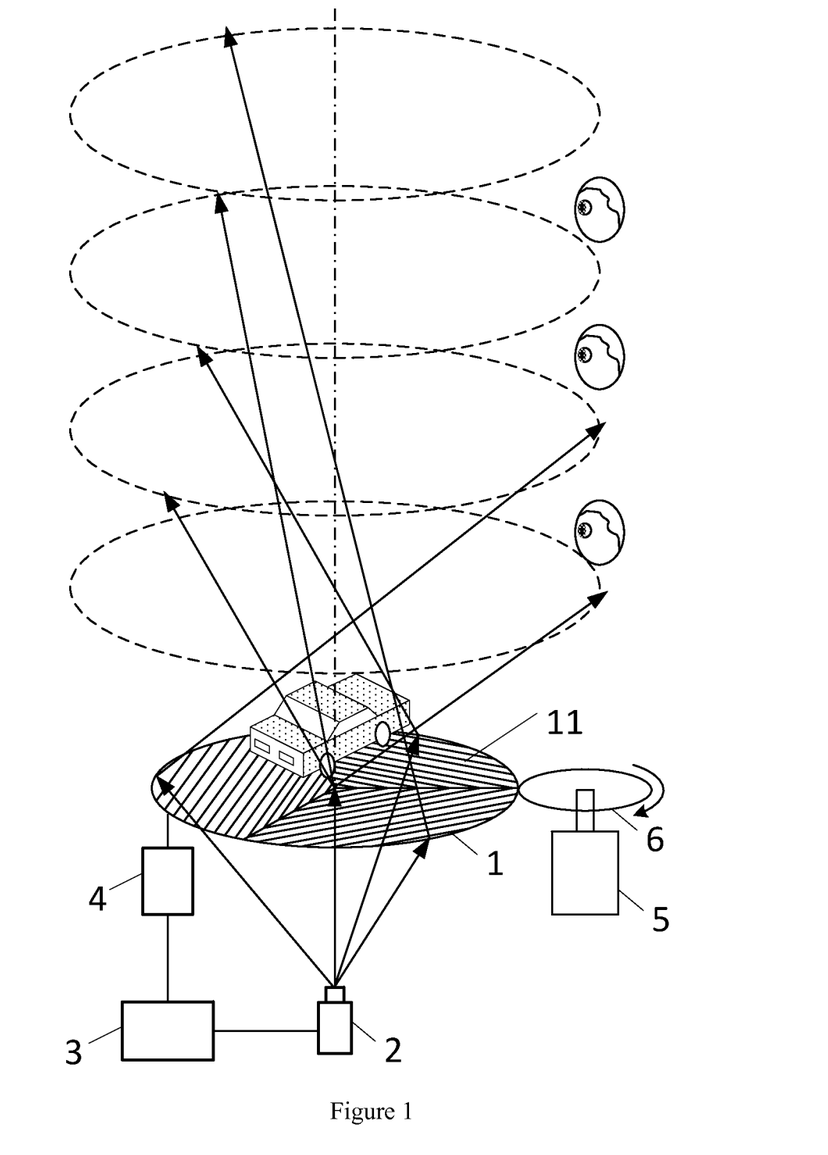
FIG. 1 illustrates one embodiment of the combined-screen-based multi-pitching angle suspended panoramic space 3D display device provided in this invention.

As shown in FIG. 1, a combined-screen-based multi-pitching angle suspended panoramic space 3D display device comprises: a combined transmitted deflective diffusing screen 1, a high speed projector 2, an image control module 3, a rotation detecting module 4, a motor 5 and a drive mechanism 6.

Figure 2:
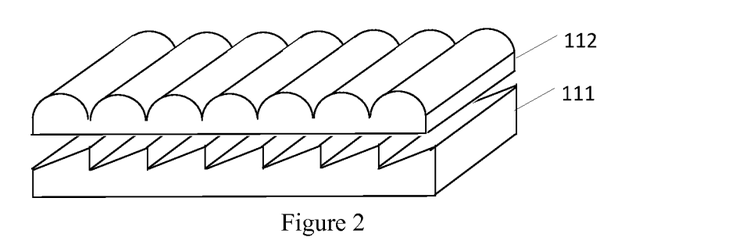
FIG. 2 illustrates the structure of the transmitted composite deflective diffusing screen in FIG. 1.
Figure 3:
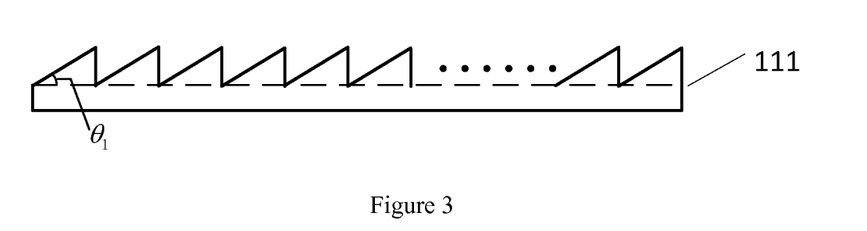
FIG. 3 illustrates the cross section of the transmitted saw-toothed grating in FIG. 2.

The transmitted deflective diffusing screen 1 comprises multiple transmitted deflective sub-diffusing screens 11 of different chief deflecting angles spliced together, with each transmitted deflective sub-diffusing screen 11 corresponding to one pitching angle. The structure of the transmitted deflective sub-diffusing screen 11 is as shown in FIG. 2, which comprises a transmitted saw-toothed grating 111 and the first cylindrical grating 112. The transmitted saw-toothed grating 111 is arranged under the first cylindrical grating 112, and the transmitted saw-toothed grating 111 is parallel to the first cylindrical grating 112 in the grating direction. The structure of the transmitted saw-toothed grating 111 is as shown in FIG. 3, which comprises continuous arrangement of multiple triangular prism structures, and all the triangular prism structures in the transmitted saw-toothed grating 111 of each transmitted deflective sub-diffusing screen 11 have the same angle of inclination, i.e., transmitted saw-toothed gratings 111 in each transmitted deflective sub-diffusing screen 11 corresponds to one wedge angle only, and the wedge angles of the transmitted saw-toothed gratings 111 in different transmitted deflective sub-diffusing screens 11 are different.

The combined transmitted deflective diffusing screen 1 is connected with the drive mechanism 6, which rotates at a high speed under the drive of motor 5. The drive mechanism 6 can adopt a gear drive, a worm drive and a belt drive etc., which is primarily to transmit the rotation of the motor 5 to drive the combined transmitted deflective diffusing screen 1 to rotate. The rotating speed of the combined transmitted deflective diffusing screen 1 is determined by two factors: the rotating speed of the motor 5 and the drive ratio of the drive mechanism 6. Generally, the rotating axis of the combined transmitted deflective diffusing screen 1 coincides with the lens' optical axis of the high speed projector 2.

The high speed projector 2 is arranged under the combined transmitted deflective diffusing screen 1, which projects the image sequence processed ready upwards to the combined transmitted deflective diffusing screen 1.

The high speed projector 2 is also sequentially connected with the image control module 3 and the rotation detecting module 4. The detecting module 4 is a photosensor or a mechanical position switch (one or more detection module(s) 4 can be arranged), which detects the rotating speed and initial position of the combined transmitted deflective diffusing 1, and sends the signal of the rotating speed and the initial position to the image control module 3. The image control module 3 controls the initial position and the frame frequency of the image sequence projected by the high speed projector 2 according to the signal received, realizing synchronism of the image sequence projected by the high speed projector 2 and the rotation of the combined transmitted deflective diffusing screen 1. The image control module 3 is an FPGA-based control module or a DSP-based control module or a computer.

In the combined-screen-based multi-pitching angle suspended panoramic space 3D display device described above, the shape of the combined transmitted deflective diffusing screen 1 can be circle, rectangle or polygon etc., generally adopting a symmetrical structure, such as a circle or a regular polygon. Assuming the combined transmitted deflective diffusing screen 1 is a circle or a regular polygon, the 3D display device has N pitching angles in the vertical direction, and generally, the combined transmitted deflective diffusing screen 1 comprises N transmitted deflective sub-diffusing screens 11, which are evenly distributed in the combined transmitted deflective diffusing screen 1, then the central angle corresponding to each transmitted deflective sub-diffusing screen 11 is $360/N°$, and the grating directions of the transmitted saw-toothed grating 111 and the first cylindrical grating 112 are both perpendicular to the symmetry axis on the horizontal surface of transmitted deflective sub-diffusing screen 11.

In the combined transmitted deflective diffusing g screen 1, each transmitted deflective sub-diffusing screen 11 is arranged at one side of the rotating axis of the combined transmitted deflective diffusing screen 1, which deflects the light rays projected by the high speed projector 2 towards another side of the rotating axis of the combined transmitted deflective diffusing screen 1, the reflected light rays scatter at a certain angle in the deflecting direction, and project at a small angle in the direction perpendicular to the deflecting direction. The chief deflecting angle of the light rays is determined by the characteristics of the transmitted deflective sub-diffusing screen 11. Different transmitted deflective sub-diffusing screens 11 have different chief deflecting angles, and each chief deflecting angle corresponds to a pitching angle.

In each transmitted deflective sub-diffusing screen 11, the major role of the transmitted saw-toothed grating 111 is to deflect the light rays projected by the high speed projector 2 to the other side of the rotating axis of the combined transmitted deflective diffusing screen 1. Light rays are generally deflected through projection or reflection, and the wedge angle of the transmitted saw-toothed grating 111 determines the deflecting angle and direction of the light rays. The role of the first cylindrical grating 112 is to respectively limit the emitting angles of the projected light rays in the grating direction and in the direction perpendicular to the grating direction to allow the light rays to emit in a small diffusing angle in the grating direction and scatter at a certain angle in the direction perpendicular to the grating direction. When the transmitted deflective sub-diffusing screen 11 emits at a small scattering angle in the horizontal direction perpendicular to the chief deflecting light ray direction and the diffusing angle is $\leq 360/M°$ (M is the number of the images projected by the high speed projector 2 when the combined transmitted deflective diffusing screen 1 rotates one cycle). When the transmitted deflective sub-diffusing screen 11 scatters at a certain angle in the deflecting direction, the degree of the scattering angle is related to the positions and sizes of the N separated circular watching areas, it needs to be ensured that only the image corresponding to that pitching angle can be seen in the N separated circular watching areas, and the images corresponding to other pitching angles cannot be seen. The degree of the scattering angle can be determined by selecting the first cylindrical grating 112 with an appropriate cylindrical diameter and refractive index.

Assuming the 3D display device has N pitching angles in the vertical direction, then there are N separated circular areas at different height levels around the display device for the viewers of different height levels to watch the panoramic 3D display. Under this situation, the combined transmitted deflective diffusing screen 1 comprises at least N transmitted deflective sub-diffusing screens 11. Generally, the combined transmitted deflective diffusing screen 1 comprises N transmitted deflective sub-diffusing screens 11, with each transmitted deflective sub-diffusing screen 11 corresponding to one pitching angle.

When the combined transmitted deflective diffusing screen 1 is not rotating, check the image seen from different viewpoints with the same horizontal position and in vertical N separated circular areas, it is found that from the viewpoint in one circular area only, one narrow strip image on the transmitted deflective sub-diffusing screen 11 that corresponds to the pitching angle in that circular area can be see. Since each viewpoint with the same horizontal position and in N separated circular areas corresponds to one pitching angle, and each pitching angle corresponds to one transmitted deflective sub-diffusing screen 11, only when the corresponding transmitted deflective sub-diffusing screen 11 rotates to the position for the viewpoint in this pitching angle, can the viewpoint in this circular area see the corresponding narrow strip image. Due to the fact that the viewpoints mentioned above correspond to different pitching angles, the transmitted deflective sub-diffusing screens 11 that correspond to different pitching angles are also different, and different transmitted deflective sub-diffusing screens 11 have different deflecting angles, and, therefore, the narrow strip images seen from different viewpoints of the same horizontal level described above also have slight differences.

When the combined transmitted deflective diffusing screen 1 rotates, the high speed projector 2 changes images, from the viewpoints that correspond to the same horizontal level and that are in N separated circular areas, the composite image of the narrow strip images of different positions of the continuous multiple images in the projected image sequence for that view area can be seen.

When the combined transmitted deflective diffusing screen 1 rotates one cycle, the high speed projector 2 projects M images, with each image containing image information of N pitching angles in the vertical direction. When the combined transmitted deflective diffusing screen 1 rotates $360/M°$, the high speed projector 2 changes one image. To satisfy the visual persistence of naked eyes and reduce flashing, a high refresh rate is generally required. A high refresh rate is to be realized through a high speed rotation of the combined transmitted deflective diffusing screen 1. Assuming the rotating speed of the combined transmitted deflective diffusing screen 1 is ω, then the frame frequency F of the high speed projector 2 is Mω, and the refresh rate of the 3D scene is also ω. When the angular density of view is high enough, the two naked eyes will be in two different horizontal view areas and see two slightly different images to produce stereo visual effects, the 3D scene formed by two eyes is suspended over the combined transmitted deflective diffusing screen 1 for the surrounding viewers to explore and interact. Generally, the number of the images to be projected for one cycle of rotation shall be over 200 frames, i.e., M≥200. If the refresh rate ω of the 3D scene is at 15 r/s, the frame frequency F of the projector needs to reach at least 3000 frames/s, thus a high frame frequency projector is required. Due to the fact that this multi-pitching angle 3D display will project all image information corresponding to different pitching angles at the same time, this is to say, the resolution of the image seen by the viewer of a certain pitching angle is poor. Therefore, to obtain more vivid fine 3D image, the space light modulator of the high speed projector 2 needs high resolution. The most commonly used high speed projector 2 is a single-chip or three-chip DMD (digital micromirror device) projector.

Embodiment 2

Figure 4:
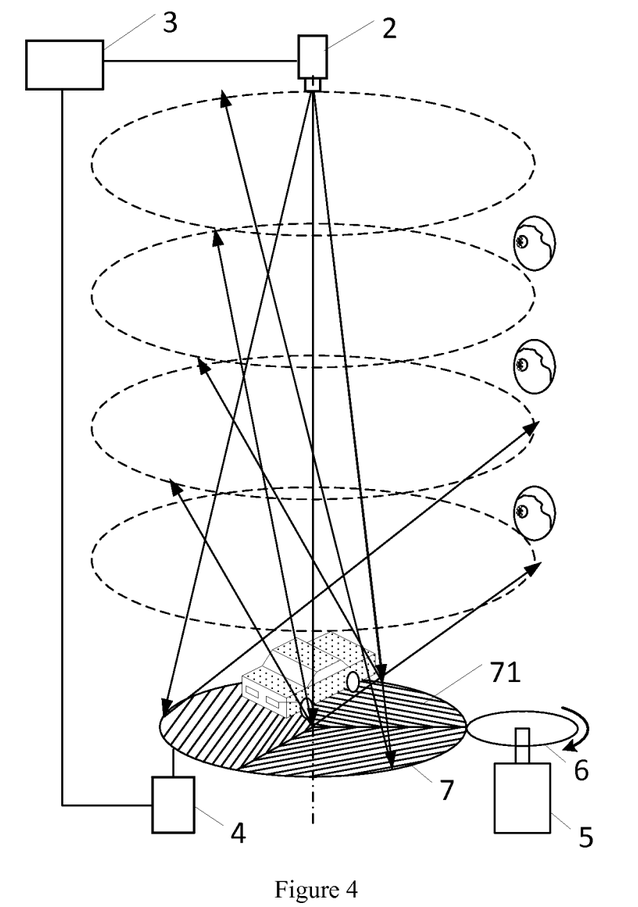
FIG. 4 illustrates another embodiment of the combined-screen-based multi-pitching angle suspended panoramic space 3D display device provided in this invention.

FIG. 4 shows another type of combined-screen-based multi-pitching angle suspended panoramic space 3D display device comprises: a high speed projector 2, an image control module 3, a rotation detecting module 4, a motor 5, a drive mechanism 6 and a combined reflective deflective diffusing screen 7.

Figure 5:
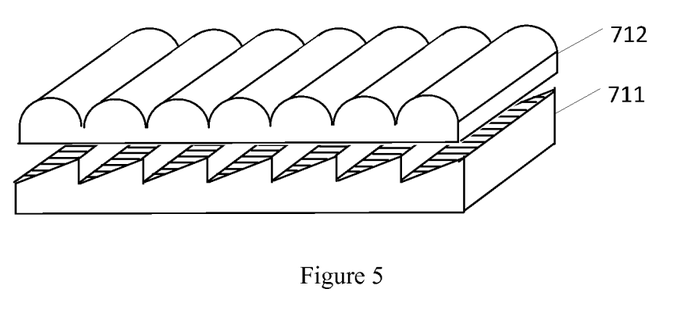
FIG. 5 illustrates the structure of the reflective composite deflective diffusing screen in FIG. 4.
Figure 6:
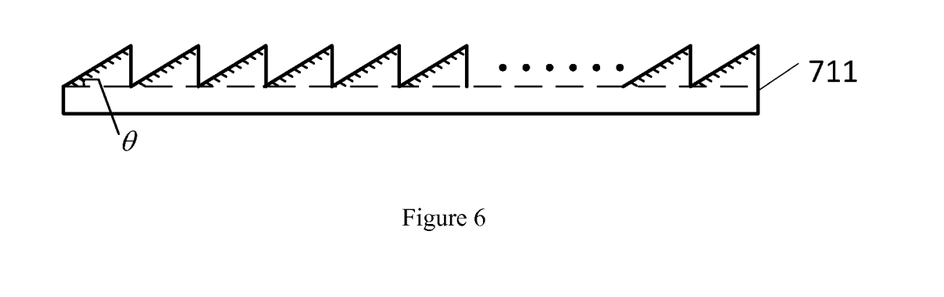
FIG. 6 illustrates the cross section of the reflective saw-toothed grating in FIG. 5.

The reflective deflective diffusing screen 7 comprises multiple reflective deflective sub-diffusing screens 71 of different chief deflecting angles spliced together, with each reflective deflective sub-diffusing screen 71 corresponding to one pitching angle. The structure of the reflective deflective sub-diffusing screen 71 is as shown in FIG. 5, which comprises a reflective saw-toothed grating 711 and the second cylindrical grating 712; the reflective saw-toothed grating 711 is arranged under the second cylindrical grating 712, and the reflective saw-toothed grating 711 is parallel to the second cylindrical grating 712 in the grating direction. The structure of the reflective saw-toothed grating 711 is as shown in FIG. 6, which comprises continuous arrangement of multiple triangular prism structures, with the surface of each triangular prism structure plated with reflective coating for reflecting the light rays. All the triangular prism structures in the reflective saw-toothed grating 711 in each reflective deflective sub-diffusing screen 71 have the same angle of inclination, i.e., the reflective saw-toothed gratings 711 in each reflective deflective sub-diffusing screen 71 corresponds to one wedge angle only, and the wedge angles of reflective saw-toothed gratings 711 in different reflective deflective sub-diffusing screens 71 are different.

The combined reflective deflective diffusing screen 7 is connected with the drive mechanism 6, which rotates at a high speed under the drive of the motor 5. The drive mechanism 6 can adopt a gear drive, a worm drive and a belt drive etc., which is primarily to transmit the rotation of the motor 5 to drive the combined reflective deflective diffusing screen 7 to rotate. The rotating speed of the combined reflective deflective diffusing screen 7 is determined by two factors: the rotating speed of the motor 5 and the drive ratio of the drive mechanism 6. Generally, the spindle of the combined reflective deflective diffusing screen 7 coincides with the ray axis of the lens of the high speed projector 2.

The high speed projector 2 is arranged over the combined reflective deflective diffusing screen 7, which projects the image sequence processed ready downwards to the combined reflective deflective diffusing screen 7.

The high speed projector 2 is also sequentially connected with the image control module 3 and the rotation detecting module 4. The detecting module 4 is a photosensor or a mechanical position switch (one or more detection module(s) 4 can be arranged), which detects the rotating speed and initial position of the combined reflective deflective diffusing screen 7, and sends the signal of the rotating speed and the initial position to the image control module 3. The image control module 3 controls the initial position and the frame frequency of the image sequence projected by the high speed projector 2 according to the signal received, realizing synchronism of the image sequence projected by the high speed projector 2 and the rotation of the combined reflective deflective diffusing screen 7. The image control module 3 is an FPGA-based control module or a DSP-based control module or a computer.

In the combined-screen-based multi-pitching angle suspended panoramic space 3D display device described above, the shape of the combined reflective deflective diffusing screen 7 can be a circle, a rectangle or a polygon etc., generally adopting a symmetrical structure, such as a circle or a regular polygon. Assuming the combined reflective deflective diffusing screen 7 is a circle or a regular polygon, the 3D display device has N pitching angles in the vertical direction, and generally, the combined reflective deflective diffusing screen 7 comprises N reflective deflective sub-diffusing screens 71, which are evenly distributed in the combined reflective deflective diffusing screen 7, then the central angle corresponding to each reflective deflective sub-diffusing screen 71 is 360/N°, and the grating directions of the reflective saw-toothed grating 711 and the second cylindrical grating 712 are both perpendicular to the symmetry axis on the horizontal surface of the reflective deflective sub-diffusing screen 71.

In the combined reflective deflective diffusing screen 7, each transmitted deflective sub-diffusing screen 71 is arranged at one side of the rotating axis of the combined reflective deflective diffusing screen 7, which deflects the light rays projected by the high speed projector 2 towards another side of the rotating axis of the combined reflective deflective diffusing screen 7, the reflected light rays scatter at a certain angle in the deflecting direction, and project at a small angle in the direction perpendicular to the deflecting direction. The chief deflecting angle of the light rays is determined by the characteristics of the reflective deflective sub-diffusing screen 71. The different reflective deflective sub-diffusing screens 71 have different chief deflecting angles, and each chief deflecting angle corresponds to a pitching angle.

In each reflective deflective sub-diffusing screen 71, the major role of the reflective saw-toothed grating 711 is to deflect the light rays projected by the high speed projector 2 to the other side of the rotating axis of the combined reflective deflective diffusing screen 7. Light rays are generally deflected through surface reflection, and the wedge angle degree of the reflective saw-toothed grating 711 determines the deflecting angle and direction of the light rays. The role of the first cylindrical grating 712 is to respectively limit the emitting angles of the projected light rays in the grating direction and in the direction perpendicular to the grating direction to allow the light rays to emit in a small diffusing angle in the grating direction and scatter at a certain angle in the direction perpendicular to the grating direction. When the reflective deflective sub-diffusing screen 71 emits at a small diffusing angle in the horizontal direction perpendicular to the chief deflecting light ray direction and the diffusing angle is ≤360/M° (M is the number of the images reflected by the high speed projector 2 when the combined reflective deflective diffusing screen 7 rotates one cycle); when the reflective deflective sub-diffusing screen 71 scatters at a certain angle in the deflecting direction, the degree of the scattering angle is related to the positions and sizes of the N separated circular watching areas, it needs to be ensured that only the image corresponding to that pitching angle can be seen in the N separated circular watching areas, and the images corresponding to other pitching angles cannot be seen. The degree of the scattering angle can be determined by selecting the second cylindrical grating 712 with an appropriate cylindrical diameter and a refractive index.

Assuming the 3D display device has N pitching angles in the vertical direction, then there are N separated circular areas at different height levels around the display device for the viewers of different height levels to watch the panoramic 3D display. Under this situation, the combined reflective deflective diffusing screen 7 comprises at least N reflective deflective sub-diffusing screens 71. Generally, the combined reflective deflective diffusing screen 7 comprises N reflective deflective sub-diffusing screens 71, with each reflective deflective sub-diffusing screen 71 corresponding to one pitching angle.

When the combined reflective deflective diffusing screen 7 is not rotating, check the image seen from different viewpoints with the same horizontal position and in N vertical separated circular areas, it is found that from the viewpoints in one circular area only, one narrow strip image on the reflective deflective sub-diffusing screen 71 that corresponds to this pitching angle can be seen. Since each viewpoint with the same horizontal position and in N vertical separated circular areas corresponds to one pitching angle, and each pitching angle corresponds to one transmitted deflective sub-diffusing screen 71, only when the reflective deflective sub-diffusing screen 71 corresponding to this pitching angle rotates to the position that corresponds to that viewpoint, can the viewpoint in this circular area see the corresponding narrow strip image. Due to the fact that the viewpoints mentioned above correspond to different pitching angles, the reflective deflective sub-diffusing screens 71 that correspond to different pitching angles are also different, and different reflective deflective sub-diffusing screens 71 have different deflecting angles, therefore, the narrow strip images seen from different viewpoints of the same horizontal level described above also have slight differences.

When the combined reflective deflective diffusing screen 7 rotates, the high speed projector 2 changes images, from the view points that correspond to the same horizontal level and that are in N separated circular areas, the composite image of the narrow strip images of different positions of the continuous multiple images in the projected image sequence for that viewpoint area can be seen.

When the combined reflective deflective diffusing screen 7 rotates one cycle, the high speed projector 2 projects M images, with each image containing image information of N pitching angles in the vertical direction. When the combined reflective deflective diffusing screen 7 rotates 360/M°, the high speed projector 2 changes one image. To satisfy the visual persistence of naked eyes and reduce flashing, a high refresh rate is generally required. The high refresh rate is to be realized through high speed rotation of the combined reflective deflective diffusing screen 7. Assuming the rotating speed of the combined reflective deflective diffusing screen 7 is ω, then the frame frequency F of the high speed projector 2 is Mω, and the refresh rate of the 3D scene is also ω. When the angular density of view is high enough, the two naked eyes will be in two different horizontal view areas and see two slightly different images to produce stereo visual effects, the 3D scene formed by two eyes is suspended over the combined reflective deflective diffusing screen 7 for the surrounding viewers to explore and interact. Generally, the number of the images to be projected for one cycle of rotation shall be over 200 frames, i.e., M≥200. If the refresh rate ω of the 3D scene is at 15 r/s, the frame frequency F of the projector needs to reach at least 3000 frames/s, a high frame frequency projector is required. Due to the fact that this multi-pitching angle 3D display will project all image information corresponding to different pitching angles at the same time, this is to say, the resolution of the image seen by the viewer of a certain pitching angle is poor. Therefore, to obtain more vivid fine 3D image, the spacial light modulator of the high speed projector 2 needs a high resolution. The most commonly used high speed projector 2 is a single-chip or a three-chip DMD (digital micromirror device) projector.

The invention claimed is:

1. A combined-screen-based multi-pitching angle suspended panoramic space 3D display device comprising: a combined transmitted deflective diffusing screen, a high speed projector, an image control module, a rotation detecting module, a motor and a drive mechanism; wherein the combined transmitted deflective diffusing screen is connected with the drive mechanism, which, under the drive of the rotation of the motor, drives the combined transmitted deflective diffusing screen to rotate; the rotating axis of the combined transmitted deflective diffusing screen coincides with the lens' optical axis of the high speed projector; the high speed projector is arranged under the combined transmitted deflective diffusing screen, which projects an image upwards to the combined transmitted deflective diffusing screen; the high speed projector is also sequentially connected with the image control module and the rotation detecting module; the combined transmitted deflective diffusing screen comprises multiple transmitted deflective sub-diffusing screens of different chief deflecting angles spliced together, with each transmitted deflective sub-diffusing screen corresponding to one pitching angle; wherein each transmitted deflective sub-diffusing screen comprises transmitted saw-toothed grating and cylindrical grating parallel in the grating direction; the transmitted saw-toothed grating comprises continuous arrangement of multiple triangular prism structures, and all the triangular prism structures in the transmitted saw-toothed grating in each transmitted deflective sub-diffusing screen have the same angle of inclination; the rotation detecting module detects the rotating speed and initial position of the transmitted deflective sub-diffusing screen, and sends the signal of the rotating speed and the initial position to the image control module; the image control module controls the initial position and the projecting frame frequency of the high speed projector according to the signal received, realizing synchronism of the projected image sequence of the high speed projector and the rotation of the combined transmitted deflective diffusing screen.

2. The combined-screen-based multi-pitching angle suspended panoramic space 3D display device as described in claim 1, which is characterized in that an image generator is a Field Programmable Gate Array (FPGA)-based control module or a digital-signal-processor (DSP)-based control module or a computer.

3. The combined-screen-based multi-pitching angle suspended panoramic space 3D display device as described in claim 1, the detecting module is a photosensor or a mechanical position switch.

4. A combined-screen-based multi-pitching angle suspended panoramic space 3D display device comprising: a combined reflective deflective diffusing screen, a high speed projector, an image control module, a rotation detecting module, a motor and a drive mechanism, wherein the combined reflective deflective diffusing screen is connected with the drive mechanism, which, under the drive of the motor, drives the combined reflective deflective diffusing screen to rotate; the rotating axis of the combined reflective deflective diffusing screen coincides with the lens' optical axis of the high speed projector; the high speed reflector is arranged over the combined reflective deflective diffusing screen, which projects the image downwards to the combined reflective deflective diffusing screen; the high speed projector is also sequentially connected with the image control module and the rotation detecting module;

the combined reflective deflective diffusing screen comprises multiple reflective deflective sub-diffusing screens of different chief deflecting angles spliced together, with each reflective deflective sub-diffusing screen corresponding to one pitching angle; wherein each reflective deflective sub-diffusing screen comprises reflective saw-toothed grating and cylindrical grating parallel in the grating direction; the reflective saw-toothed grating is arranged under the cylindrical grating, which comprises continuous arrangement of multiple triangular prism structures, with the surface of each triangular prism structure plated with reflective coating, and all the triangular prism structures in the reflective saw-toothed grating in each reflective deflective sub-diffusing screen have the same angle of inclination;

the rotation detecting module detects the rotating speed and initial position of the reflective deflective sub-diffusing screen, and sends the signal of the rotating speed and the initial position to the image control module; the image control module controls the initial position and the projecting frame frequency of the high speed projector according to the signal received, realizing synchronism of the projected image sequence of the high speed projector and the rotation of the projective combined deflecting scattering screen.

5. The combined-screen-based multi-pitching angle suspended panoramic space 3D display device as described in claim 4, which is characterized in that an image generator is an FPGA-based control module or a DSP-based control module or a computer.

6. The combined-screen-based multi-pitching angle suspended panoramic space 3D display device as described in claim 4, the detecting module is a photosensor or a mechanical position switch.

* * * * *